May 15, 1928.  
D. M. SOLENBERGER  
PISTON RING  
Filed April 9, 1924  
1,670,082
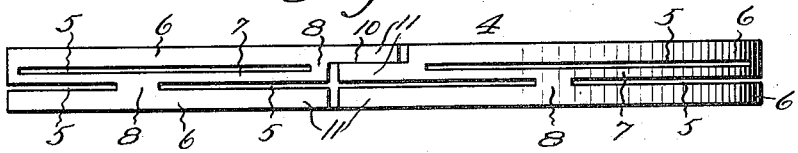

Patented May 15, 1928.

1,670,082

UNITED STATES PATENT OFFICE.

DEAN M. SOLENBERGER, OF CLEVELAND, OHIO, ASSIGNOR TO THE SIMPLEX PISTON RING COMPANY OF AMERICA, INC., OF CLEVELAND, OHIO, A CORPORATION OF OHIO.

PISTON RING.

Application filed April 9, 1924. Serial No. 705,172.

This invention relates to piston rings such as are used for sealing the intervening space between the pistons and cylinder walls of an internal combustion engine and my invention has particular reference to improvements in a piston ring of the general character of that disclosed in my co-pending application Serial No. 632,290 filed April 16, 1922.

I have found that in order to provide a perfect seal between the piston and cylinder wall, the sealing ring must be free to move radially within the ring groove in the piston, and such freedom of movement must be sufficient to permit the ring to conform to the cylinder wall at all engine speeds. Due to the fact that an internal combustion engine often operates at very high speeds, and on the upstroke the piston tends to bear on one side of the cylinder wall with a greater force than on the other, and vice versa on the down stroke, it will be readily apparent that the time element for this radial movement or breathing of the ring within the ring groove is exceedingly small and must be almost instantaneous. In cases where the cylinder has been worn out of round, this radial movement of the ring is of course more pronounced than with substantially round cylinders and pistons, but in any event a certain degree of movement is necessary due to the lateral thrust of the piston in opposite directions on the up and down stroke.

If the ordinary ring is made with sufficient clearance in width to permit, to a certain degree, this instantaneous radial movement, then the ring moves back and forth in a longitudinal direction within the ring groove on the up and down stroke of the piston. The exceedingly small longitudinal motion at first is of little consequence but this constant hammering soon widens the ring groove to an appreciable extent and the longitudinal movement of the ring within the groove then causes the ring to function as a pump with the result that the spark plugs are soon fouled with oil and the combustion chamber filled with carbon.

It has been the general practice heretofore to overcome the above difficulties by fitting the ring very accurately to the ring groove and then placing a spring expander between the sealing ring and piston and while in some cases this arrangement tends to correct the trouble to some extent, the result is far from being entirely satisfactory. The chief reason for failure of this arrangement is due to the aforementioned widening of the ring groove and also to the fact that there is not sufficient space between the sealing ring and piston to place an expander of sufficient size to exert a radial force great enough on the present day piston ring to cause said ring to conform instantaneously to the cylinder wall.

It is the general object of the present invention to provide an exceedingly flexible sealing ring so that the same may conform instantaneously with the cylinder wall and be effective even at high engine speeds, in providing a perfect seal between the piston and cylinder wall.

Another object is to provide a ring of this character which shall be compressible longitudinally and hence automatically take up any wear or irregularities in the ring groove and thereby prevent oil pumping due to longitudinal movement of the ring within the ring groove.

Another object is to provide a ring of the aforesaid character which shall be relatively thin in depth so as to be exceedingly flexible and permit the ring to readily conform to out of round cylinders and also to provide sufficient space between the ring and piston to insert, when desired, an expander of sufficient size to exert the necessary force to produce the aforementioned instantaneous radial movement of the ring within the ring groove.

A still further object is to provide a sealing ring of this general character which shall be simple in construction, inexpensive to manufacture, easy to install, and highly efficient in operation.

With these and other objects in view, the invention consists in the various novel features of construction and arrangement or combination, all of which will be fully described hereinafter and pointed out in the appended claims.

In the drawing accompanying and forming part of this application, Fig. 1 is a side elevation of a ring constructed in accordance with my invention; Fig. 2 is a fragmentary vertical sectional view through a piston and cylinder showing the piston fitted with a standard ring and two rings constructed in accordance with my invention; Fig. 3 is a plan view of my ring showing the same fitted with an expander ring; and Fig. 4 is a fragmentary sectional view through the piston groove and showing one of my rings fitted with an expander ring and placed within a cylinder.

Describing the various parts by reference characters 1 denotes a cylinder and 2 a piston reciprocable therein and provided with a plurality of circumferential grooves 3 for the reception of the sealing rings. One or more of these rings are constructed in accordance with my invention and preferably similar to that shown particularly in Fig. 1, wherein 4 denotes the sealing ring which is provided with a plurality of upper and lower spaced overlapping circumferential slots 5. These slots are preferably so arranged that they define outer bars 6 and central bars 7, said outer bars being connected at spaced intervals by solid portions 8 to the central bars. This arrangement permits the ring to be compressed longitudinally at all points so that when inserted in a ring groove, the ring will automatically exert a slight pressure against the side edges of the ring groove and accommodate itself evenly to ring grooves which are worn or of slightly varying widths. It will be noted that outer bars are of greater width than the center bars. By varying the length, breadth and thickness of the center bars I am enabled to control the longitudinal pressure exerted by the ring against the side edges of the ring groove. A relatively thin center bar as shown permits me to obtain a relatively low longitudinal pressure as will be explained more fully hereinafter. Also it will be noted that by providing relatively wide outer bars, the danger of breakage due to handling of the ring when installing the same, is reduced to a minimum.

The stepped joint indicated at 10 is preferably so arranged that the circumferential line of overlap of the tongues is to one side of the circumferential axis of the ring so as to provide strong and durable tongues 11. The joint as a whole is rendered flexible by continuing one of the slots 5 across the joint.

In actual practice I have discovered that the entire success of a ring of this general character is dependent upon two factors concerning the general proportions of the ring and the resultant pressures exerted by said ring. First, and most important, I have found that the longitudinal pressure of the ring when compressed to the width of the ring groove, must be very low in order to permit the aforementioned free radial movement of the ring. A ring constructed to have this sufficiently low pressure longitudinally, may be shown by mathematics to have insufficient pressure to withstand collapse due to the force of the explosion and also to the inertia of the unsupported portions of the ring when the piston reaches the end of its stroke and is starting in an opposite direction. By unsupported portions of the ring, I means those portions which are free to move due to their inertia, when the piston reaches the end of its stroke. As an example consider the ring shown in Fig. 1 fitted to a piston moving upwardly. At the upper end of the stroke the inertia of the ring will cause upper bars 6 to bear tightly against the upper side edge of the ring groove and be supported thereby. The lower bars 6 and solid portions 8 connecting the lower bars to the central bars 7 together with substantially one half the mass of the central bars are unsupported and tend to move toward the upper bars 6 due to their inertia. The converse of this is true when the piston is moving downwardly. If the inertia of these unsupported portions is greater than the longitudinal pressure of the ring against the side walls of the ring groove, it will be obvious that on the upstroke of the piston the lower bars of the ring would leave the lower side wall of ring groove and vice versa on the down stroke of the piston. If this actually happened, it would be obvious that the seal would be broken and the ring would fail to function properly. It would thus seem that a paradox has been reached. However, I have found through a large number of successful experiments the highly important fact that a ring constructed to have insufficient longitudinal pressure against the sides of the ring groove to prevent collapse due to the explosion and also to the inertia of the unsupported portions of the ring, does not collapse in actual practice, and the ring still maintains sufficient pressure against the sides of the ring groove to effectually seal the piston at these surfaces. This failure to collapse may be due to the oil filling the slots in the ring and also the ring groove and thereby supporting the ring during the instant the excessive pressures are applied. The low longitudinal pressure of the ring thus obtained is within such limits as to permit free radial movement of the ring and hence a perfect seal is obtained between the ring and cylinder wall.

As an example of one of my experiments I might state that an automobile motor fitted with a slotted ring of the general character of that shown in Fig. 1, but having a longitudinal pressure of 10 lbs. when compressed to the width of the ring groove which pressure was slightly greater than the inertia value of the unsupported portions, operated more or less satisfactorily when the car was driven at low speeds, but when driven at 25 miles per hour or over, the exhaust smoked badly and the firing chamber became fouled with oil. This fouling of the firing chamber was due to the inability of the ring to move freely in a radial direction at medium to high speeds. A new ring of the same general character as before but having a longitudinal pressure of 5 lbs., which was materially less than the theoretical collapse value, was placed in the car and the previous failure immediately turned to success as the exhaust showed clear at even the maximum speed and the firing chamber and associated parts showed an entire absence of oil. The compression was greatly increased and the consumption of oil reduced to a minimum.

In general I have found that a longitudinal pressure having a ratio of between zero and substantially 2¾ lbs. per inch of diameter of the ring will prove satisfactory or in other words that a ring constructed to have a longitudinal pressure (when compressed to the size of the ring groove) which is less than the theoretical collapse value at maximum speed will prove successful. It will be understood that the term maximum speed is used in the specification and claims to mean the theoretical speed at which the motor develops maximum horsepower.

In new or comparatively new motors wherein the cylinders are substantially round, I use a ring similar to that shown in Fig. 1 and having the usual depth of the standard ring as indicated at 4ª in Fig. 2.

The second feature of my ring consists in making the depth of the ring within certain limits when it is to be used for worn or out of round cylinders, so that the ring will be extremely flexible in accommodating itself readily to the cylinder wall and also providing sufficient space between the ring and the bottom or inner wall of the standard ring groove to permit an expander to be inserted therein to assist the ring in conforming to the cylinder wall. By referring to Fig. 2, it will be noted that I have shown one of my improved rings in the upper groove and a standard ring 12 in the lower groove. It will be at once apparent that my ring is materially less in depth than the standard ring. The depth of standard rings varies between 3½% to 5% of the diameter of the ring while I preferably make my ring so that the depth thereof is less than 3% of the diameter. The small depth of the ring together with its peculiar slotted construction provides a maximum flexibility so that the ring may be readily distorted to any desired shape. In order to assist the ring in conforming to out of round cylinders I preferably place an expander 14 back of the ring as shown in Figs. 3 and 4. This expander is formed from a resilient metal such as spring steel and is provided with an undulating circumferential contour. The surfaces 15 which are adapted to contact with the ring are arcuate so as to provide a maximum area of contact therewith, and the portions 16 lying intermediate these arcuate surfaces are formed with substantially the same radius as the aforementioned arcuate portions but are disposed in an opposite direction. The portions 17 connecting the oppositely disposed arcuate surfaces are substantially straight. An expander thus formed provides maximum area of contact between the piston and ring and thus reduces wear on the expander and also insures the exertion of a radial force over large areas of the ring so that the ring will readily conform to all irregularities of the cylinder. The increased space provided between the ring and bottom of the ring groove, as explained above, permits the use of an expander of this particular type and the combination of my ring and expander provides a perfect seal between the piston and cylinder for new motors or for motors whose cyliders are badly worn out of round. In fact, numerous motors, wherein the wear had been so great that regrinding of the cylinders seemed the only remedy, have been fitted with my rings and expander and the result produced is equal in every instance to a regrinding job and at a fraction of the cost thereof.

Having thus described my invention, what I claim is:—

1. The combination with a cylinder and an annularly grooved piston therein, of a single piece axially expansible split ring in said groove, said ring being limited in radial thickness for extreme flexibility and of itself exerting a radial tension less than required for maintaining sealing contact with the cylinder, and a corrugated ribbon expander in said groove for exerting a distributed radial pressure on said ring sufficient to conform the same to the surface of a distorted cylinder and to maintain sealing contact therewith, said pressure being independent of any axial pressure of said ring against a side wall of said groove.

2. The combination with a cylinder and an annularly grooved piston therein, of a single piece circumferentially slotted split ring in said groove, said ring being of a normal width greater than the groove to exert a predetermined axial tension on the side wall of the groove and being also limited in radial thickness for extreme flexibility and of itself exerting a radial tension less than required for maintaining sealing contact with said cylinder, and a corrugated ribbon expander in said groove for exerting a distributed radial pressure on said ring sufficient to conform the same to the surface of a distorted cylinder and to maintain sealing contact therewith, said pressure being independent of the axial pressure of said ring against the side wall of said groove.

3. The combination with an annularly grooved member, of a single piece ring in said groove circumferentially slotted to impart axial resiliency thereto, and a corrugated ribbon expander in said groove bearing against the bottom thereof and against said ring to exert a distributed radial pressure which is sufficient to overcome the frictional resistance due to the axial pressure.

4. The combination with an annularly grooved member, of a single piece ring in said groove circumferentially slotted to impart axial resiliency thereto and to exert a predetermined pressure on the side walls thereof sufficient to maintain a seal under working conditions, and resilient means reacting on said ring and grooved member for exerting a distributed radial pressure thereon that is sufficient to overcome the frictional resistance due to said axial pressure.

5. The combination with relatively reciprocating members having clearance therebetween, one of said members having an annular groove therein, of a single piece ring within said groove resiliently axially expansible to exert a predetermined pressure against the side walls thereof sufficient to maintain a seal under working conditions, said ring being also movable radially in said groove during reciprocation, and means for applying a distributed radial pressure between said ring and grooved member sufficiently in excess of said axial pressure to overcome the frictional resistance to said radial movement of the ring in said groove without excessive friction on the other of said reciprocating members.

6. The combination with relatively reciprocating members having clearance therebetween, one of said members having an annular groove therein, of a single piece ring within said groove resiliently axially expansible to exert a predetermined pressure against the side walls thereof, said ring being also movable radially in said groove during reciprocation, and means for applying a distributed radial pressure between said ring and grooved member sufficiently in excess of said axial pressure to overcome the frictional resistance to said radial movement of the ring in said groove and also resisting lateral displacement of said grooved member during reciprocation to assist in holding the same from slap against the cooperating member.

7. The combination, with a reciprocating member having a groove, of a one piece circumferentially slotted split piston ring in said groove, said slots being so arranged as to provide a longitudinally yieldable ring capable of exerting a slight pressure against the side walls of the ring groove, the said ring having a depth not exceeding three percent of its diameter thereby to provide flexibility in a radial direction, and an expansion ring interposed between said piston ring and the inner wall of said groove.

8. The combination with a split ring having lubricant passages extending therethrough and arranged in circumferential series, of relatively reciprocating members one of which is provided with an annular groove for receiving said ring and forming an otherwise substantially closed lubricant retaining channel and means for dividing the annular oil space within said ring groove into separate compartments.

9. The combination with a split ring having lubricant passages extending therethrough arranged in circumferential series, of relatively reciprocating members one of which is provided with an annular groove for receiving said ring and forming an otherwise substantially closed lubricant containing channel, a corrugated ribbon expander in said groove bearing against said ring and the bottom of the groove and dividing the annular space into a series of separate compartments.

10. The combination with an annularly grooved member, of a single piece ring in said groove resiliently axially expansible to maintain a sealing contact with the side walls thereof and provided with lubricant passages extending therethrough arranged in circumferential series, and a corrugated ribbon expander within said groove bearing against said ring and the bottom of the groove to form a distributed radial pressure and dividing the annular space within the groove into separate compartments.

11. In an internal combustion engine, the combination with a member having an annular groove therein of a single piece trans-split ring fitting within said groove and limited in radial thickness to impart a relatively high degree of flexibility for conforming to a non-circular or distorted cylinder and a corrugated ribbon expander seated on the bottom of the groove and exerting a distributed radial pressure on said ring.

12. In an internal combustion engine, the combination with a member having an annular groove therein, of a single piece trans-split ring fitting within said groove and limited in radial thickness to less than three and one-half per cent of the diameter to impart a relatively high degree of flexibility thereto for conforming to a non-circular or distorted cylinder and a corrugated ribbon expander seated on the bottom of the groove and exerting a distributed radial pressure on said ring.

13. In an internal combustion engine, the combination with a member having a ring groove therein, of a single piece trans-split ring in said groove circumferentially slotted to form oil passages therethrough, and a corrugated ribbon expander located between said ring and inner wall of the groove and exerting a distributed radial pressure on said ring for conforming the same to a non-circular or distorted cylinder.

14. In an internal combustion engine, the combination with a member having a ring groove therein, of a single piece trans-split ring in said groove reduced in radial depth to impart a relatively high degree of flexibility thereto for conforming to a non-circular or distorted cylinder, said ring being provided with circumferentially distributed oil passages therethrough and a corrugated ribbon expander located between said ring and the inner wall of the groove.

15. In an internal combustion engine, the combination with a member having a ring groove therein, of a single piece trans-split ring in said groove circumferentially slotted to form oil passages therethrough and being reduced in radial thickness to impart a relatively high degree of flexibility thereto for conforming to a non-circular or distorted cylinder and a corrugated ribbon expander located between said ring and the inner wall of the groove.

16. In an internal combustion engine, the combination with a member having a ring groove therein, a single piece trans-split ring in said groove having parallel series of circumferential slots therethrough, said ring being limited in radial depth to impart a relatively high degree of flexibility thereto for conforming to a non-circular or distorted cylinder, and a corrugated ribbon expander between said ring and the inner wall of the groove.

In testimony whereof I hereunto affix my signature.

DEAN M. SOLENBERGER.